(12) United States Patent
Hamlyn et al.

(10) Patent No.: US 6,490,990 B1
(45) Date of Patent: Dec. 10, 2002

(54) TECHNIQUE FOR MAKING FLOATING OBJECTS IN SYNTHETIC RESINS REINFORCED WITH CONTINUOUS FIBERS AND MADE ON WINDING MACHINERY

(75) Inventors: Alexandre Hamlyn; Clementine Gallet, both of Lyons (FR)

(73) Assignee: Coriolis Composites, Lyons (FR)

(*) Notice: Subject to any disclaimer, the term of this patent is extended or adjusted under 35 U.S.C. 154(b) by 0 days.

(21) Appl. No.: 09/600,905

(22) PCT Filed: Feb. 4, 1999

(86) PCT No.: PCT/FR99/00243

§ 371 (c)(1),
(2), (4) Date: Sep. 8, 2000

(87) PCT Pub. No.: WO99/39897

PCT Pub. Date: Aug. 12, 1999

(30) Foreign Application Priority Data

Feb. 5, 1998 (FR) .............................................. 98 01575

(51) Int. Cl.[7] ................................................ B63B 5/24

(52) U.S. Cl. ...................................................... 114/357
(58) Field of Search .......................... 114/357; 156/175, 156/189, 196; 264/157, 313

(56) References Cited

U.S. PATENT DOCUMENTS

| 494,910 A | | 4/1893 | Wells |
| 3,265,795 A | | 8/1966 | Medney |
| 3,300,355 A | | 1/1967 | Adams |
| 4,118,814 A | * | 10/1978 | Holtom ....................... 114/357 |
| 4,242,160 A | * | 12/1980 | Pinter et al. ................. 156/175 |
| 4,849,150 A | | 7/1989 | Kittaka et al. |

FOREIGN PATENT DOCUMENTS

| EP | 0 216 695 | 4/1987 |
| FR | 1.590.718 | 5/1970 |

* cited by examiner

Primary Examiner—Ed Swinehart

(57) ABSTRACT

A technique for manufacturing floating bodies, such as a boat's hull or part of such a hull, made of synthetic resins reinforced by continuous fibers, said technique including at least one filament winding step.

23 Claims, 7 Drawing Sheets

TECHNIQUE FOR MAKING FLOATING OBJECTS IN SYNTHETIC RESINS REINFORCED WITH CONTINUOUS FIBERS AND MADE ON WINDING MACHINERY

BACKGROUND OF THE INVENTION

1. Field of Invention

The invention relates to the technique of manufacturing floating bodies made of synthetic resins reinforced by continuous fibers and produced on a winding apparatus.

2. Description of Related Art

Floating bodies made of synthetic resins reinforced by fibers are conventionally manufactured by contact molding, of resin-impregnated chopped fibers, on female molds or master patterns in several parts. The cutting, laying-down and impregnating phases, excluding the case of preimpregnated fibers, are generally carried out manually. The fibers are in the form of unidirectional, two-directional or three-directional fabrics or in the form of randomly oriented short fibers.

This process has the drawback of contacting noncontinuous and nonstressed reinforcing fibers, hence unpredictable mechanical properties, and a resin applied manually, hence in general an irregular resin content. These two characteristics result in an unnecessary increase in the weight.

This process is only partly automatable. Because of the necessarily manual work, the manufacturing times cannot be improved.

This long manufacturing time does not allow a large complex part to be manufactured easily, such as the deck and the hull of a yacht, which are rarely solidified in just one go and at the same time; thus, the mechanical properties of the end product are limited because of the joining operations carried out after solidification which weaken the structure, for example the deck-hull junction on a boat. In addition, these joining operations increase the risks of the composite delaminating or debonding at the junction points, with the presence of edges at the bonded joints on the various parts joined together, risks which are not negligible in water.

In addition, contact impregnation of the fibers does not allow certain resins having high properties, and harmful via the airways or on contact with the skin, to be used.

There is a process—filament winding—which consists in winding, over a mandrel having the shape of the part desired, resin-impregnated continuous fibers placed in predetermined directions. Using this filament winding process, the continuous fibers are wound, on the one hand, homogeneously in the direction of the main stresses and, on the other hand, locally in the highly stressed regions.

This technique has the drawback of not being able to guarantee the external surface finish of the wound parts and of requiring, for some applications, finishing treatments, the use of a countermold before solidification or a machining operation after solidification. In this field, we mention document U.S. Pat. No. 3,265,795 which describes "a method of molding a fiber-reinforced plastic shell". This process, which uses an inflatable mandrel and a countermold, provides one solution to the problem of the external surface finish but does not describe the manufacture of products having a nondevelopable surface. Another solution is given in document U.S. Pat. No. 4,849,150 A which describes "a method of manufacturing a pipe made of fiber-reinforced resin". This method consists in injecting resin into a countermold, but is described only for pipes, and requires the use of specific materials.

Another drawback of the filament winding relates to the winding of structures having decreasing cross sections, a common case in floating craft. The difficulty is to maintain the fiber orientations and the thicknesses defined for the mechanical strength of the structure. Firstly, in decreasing cross sections, the fibers can slide over the mandrel and the additional thicknesses obtained in the small cross sections do not correspond to the desired thicknesses. Secondly, the structure obtained is not symmetrical with respect to the plane of symmetry of the mandrel. On this subject, document FR 1,590,718 A describes a "process for manufacturing a structure of any shape, the machine for implementing said process and the structures produced by said process". This process makes it possible to lay down tapes on a body with decreasing cross sections but does not describe either the use of a fiber-reinforced thermosetting plastic or a lay-up other than radial lay-up. In this field, we also mention document U.S. Pat. No. 3,300,355 A which describes "a method of manufacturing hollow bodies of irregular shape". This method makes it possible to lay down tapes on a body, with decreasing cross sections and groovings for producing reinforcements, but does not describe either the use of fiber-reinforced thermosetting plastic or a lay-up other than radial lay-up. Document U.S. Pat. No. 4,849,150 A, which describes "a method of manufacturing fiber-reinforced resin pipe", already mentioned, does not describe a specific winding method allowing a symmetrical structure without an overthickness to be obtained.

Another drawback of the filament winding process is the manufacture and the recovery of the mandrel after the winding. Document U.S. Pat. No. 4,494,910 A, which describes the manufacture of "structural components having a large surface area; especially rotor blades", presents a technique in which the mandrel is kept in the final part, but does not describe the manufacture of hollow parts. Document EP 0,216,695 A describes "a process and a machine for the manufacture of axisymmetric hollow parts formed from filaments extending along three different directions". This process presents a solution in which the mandrel is machined on the winding apparatus, but it is described only for axisymmetric hollow parts. Document U.S. Pat. No. 3,265,795, already mentioned, which describes "a method of molding a fiber-reinforced plastic shell", presents a method for recovering the mandrel, using two parts together, but does not describe a method for manufacturing a single part.

SUMMARY OF THE INVENTION

The invention can provide a solution to the drawbacks currently encountered in the manufacture of floating bodies made of synthetic composites, by producing them with continuous fibers on a winding apparatus, after having solved the problems posed by this manufacturing process currently unsuitable for producing such products.

The invention relates especially to a process for manufacturing a floating body, such as a boat's hull or part of such a hull, defined in the claims and which includes at least one filament winding step. This process comprises, depending on the embodiments, the combination of steps providing for:

producing a first mandrel in the form of a preform, having substantially the external shape of the floating body to be manufactured;

mounting this first mandrel on a winding apparatus and, optionally, subjecting it to a treatment of refining its external shape;

covering this first mandrel, at least partly, by winding or filament winding resin-impregnated fibers so as to obtain an outer mold or countermold, whose internal surface will undergo a treatment, such as coating with a mold release and/or with a topcoat forming the external surface of the floating body to be manufactured;

after solidification, cutting the countermold into at least two demoldable portions, for example along a longitudinal plane of symmetry;

producing a second mandrel in the form of a preform, having substantially the internal shape of the floating body to be manufactured;

mounting this second mandrel on a winding apparatus and, optionally, subjecting it to a treatment of refining its external shape;

covering the second mandrel, at least partly, by winding or filament winding, with or without resin impregnation, in order to obtain a wound body which will be the floating body;

putting the materials of the floating body between the second mandrel and the countermold under pressure;

after solidifying the materials of the floating body, such as curing, disengaging the countermold and/or subjecting the floating body to a refining treatment, cutting out at least one reservation in the latter, for example for the passage or the joining of items of equipment such as masts, keel, deck house or the like and/or for removing at least one portion of the mandrel.

A second subject of the invention is a formation of the mandrels intended for implementing the process according to the claims. A third subject of the invention is the apparatus for implementing the process according to the claims.

According to the characteristics of the invention:

The treatments of refining the external surfaces of the mandrels entail the fitting of winding-assistance devices, of suitable material and of suitable dimensions, such as pegs and/or nonslip products, making it possible to increase the adhesion between the mandrel and the fibers which will cover it.

The step of covering the first mandrel includes at least one phase of laying down at least one continuous fiber, which may or may not be impregnated with resin, along directions defined during the design of the countermold. The paths of the fibers are symmetrical with respect to at least one plane of symmetry of the first mandrel, with turnover regions in various sections of the mandrel so as to obtain at least one ply of fibers whose thicknesses are defined during the design of the countermold.

The step of covering the second mandrel includes at least one phase of laying down at least one continuous fiber, which may or may not be impregnated with resin, along directions defined during the design of the floating body. The paths of the fibers are symmetrical with respect to at least one plane of symmetry of the second mandrel, with turnover regions in various sections of the mandrel so as to obtain at least one ply of fibers whose thicknesses are defined during the design of the floating body.

The step of putting the materials of the floating body under pressure provides for an increase in the volume of the second mandrel and/or an infusion and/or an injection of resin and/or an expansion of resin, such as foaming resin, so as to obtain, on the one hand, a surface finish identical to that of the internal surface of the countermold and, on the other hand, a defined resin content.

By way of example, one embodiment of the subject of the invention is described below and illustrated schematically in the appended drawings, FIGS. 1 to 14, in which figures three orthogonal directions L, T and E are shown. The longitudinal direction, called L, corresponds to the axis of rotation of the winding apparatus and to the direction of normal movement of the floating body. The transverse direction, called T, is orthogonal to the direction L and lies in a horizontal plane passing through L. The height direction E is orthogonal to the directions L and T.

DETAILED DESCRIPTION OF PREFERRED EMBODIMENTS

The description which follows makes it possible to understand how this invention is realized and what the novel performance characteristics provided are.

Before any manufacture, a study, carried out at the design stage, has made it possible to determine the shape of the floating body to be manufactured and the various stresses to which it will be subjected. Part of this study, called sampling, defines the thickness and the number of plies, the orientation of the fibers in the various regions of the floating body, as well as the orientation, the dimensions and the positions of the various reinforcements.

Figure 1:
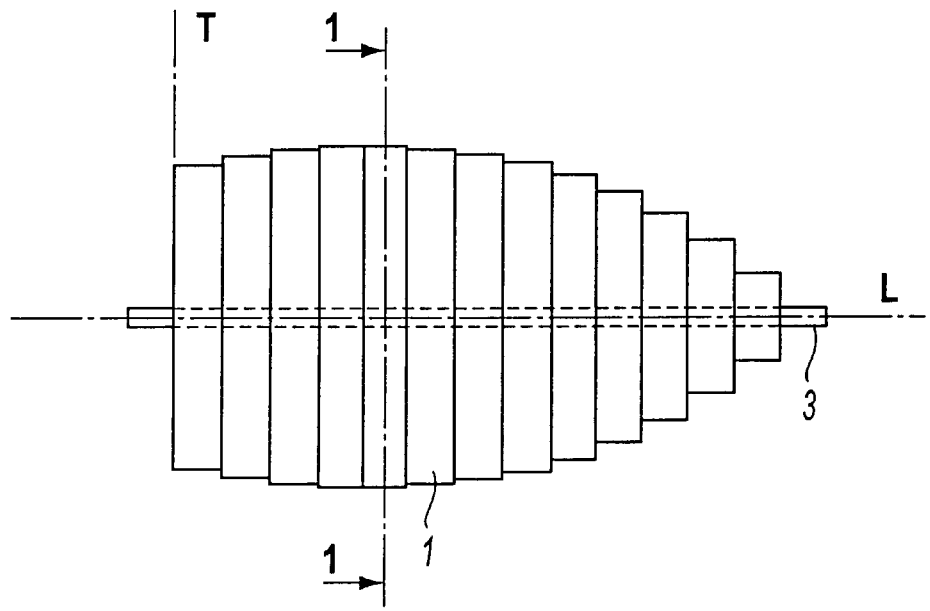
FIG. 1 is a schematic plan view of the first mandrel in the form of a preform.
Figure 2:
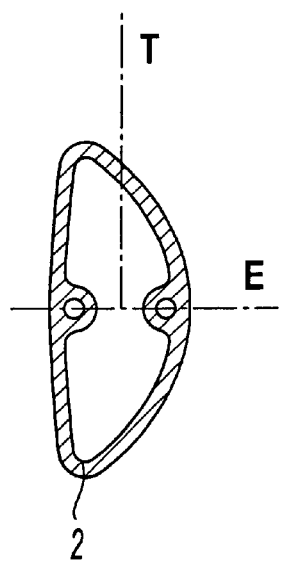
FIG. 2 is a front sectional view of an element made of synthetic foam of the first mandrel, viewed along the line 1—1 in FIG. 1.
Figure 3:
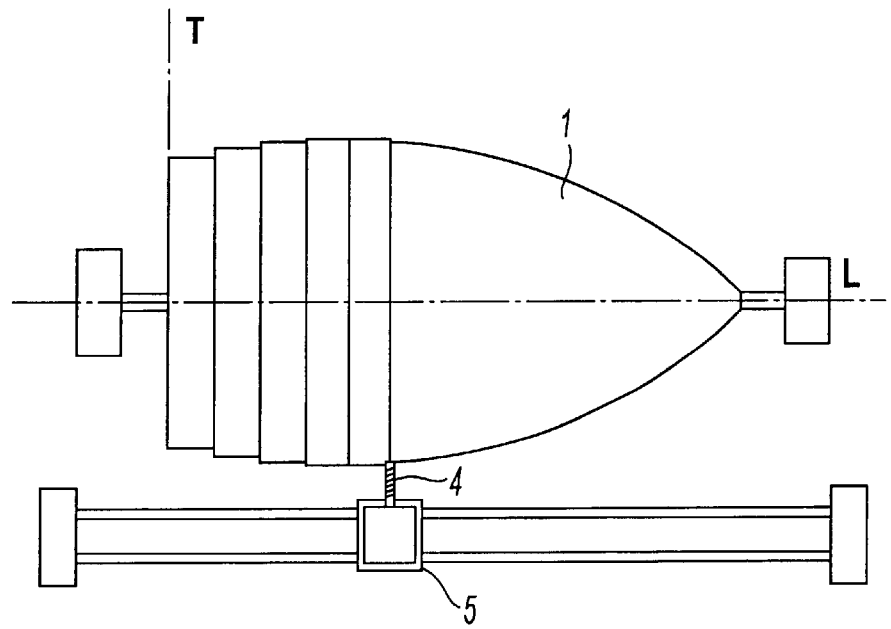
FIG. 3 is a schematic plan view of the first mandrel mounted on the winding apparatus during machining.

In the case in which a countermold 7 is to be manufactured, especially for the mass production of floating bodies, a first mandrel 1 in the form of a preform is produced. Consisting, for example, of rings of high-density polystyrene foam, labeled 2 in FIG. 2, it is divided into various transverse sections of a given thickness, which are prescored, for example using a hot wire, on the outside and on the inside, so as to maintain a minimum thickness necessary for withstanding the winding forces. This first mandrel 1 is shown schematically in FIG. 1. The rings 2 are slipped longitudinally over, adhesively bonded to and crimped onto, for example, two spindles 3 allowing the whole assembly to be driven in rotation. This mandrel in the form of a preform 1 is then mounted on the winding apparatus in order to undergo a treatment of refining its outer shape. For example, as shown in FIG. 3, a milling tool 4 placed on the tool holder 5, controlled along three axes of the winding apparatus, machines the rotationally controlled mandrel 1 so as to obtain the outer shape of the floating body 11. A topcoat, for example sprayed by a spraying system mounted on the tool holder 5, is applied over the entire mandrel 1. Grinding and polishing operations may then be carried out with grinders and polishers mounted on the tool holder 5. This mandrel 1 may also be produced from an existing floating body, which itself may be produced according to the process of the present invention. The manufacture and the preparation of the first mandrel 1 are then terminated.

Figure 4:
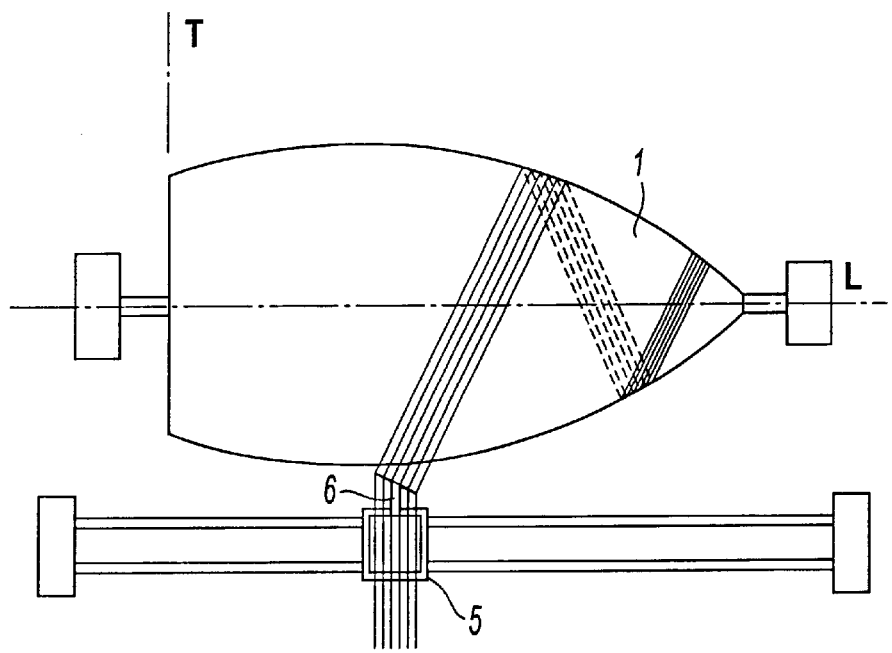
FIG. 4 is a schematic plan view of the first mandrel mounted on the winding apparatus during winding of the countermold.

A mold release agent and a topcoat forming the internal surface of the countermold 7 are sprayed over the entire mandrel 1 by a spraying system mounted on the tool holder 5. In FIG. 4, the winding is carried out by orienting the fibers so as to obtain the sampling specific to the countermold 7, with the aid of a comb 6 mounted on the tool holder. 5 and allowing the resin-impregnated fibers to be guided.

Figure 5:
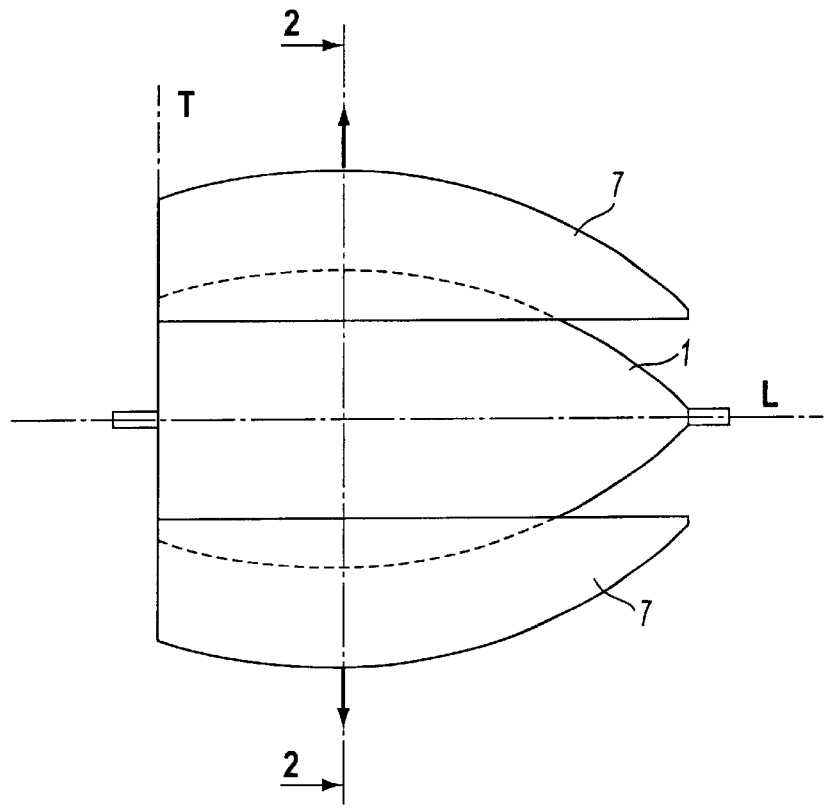
FIG. 5 is a schematic plan view of the first mandrel and of the countermold cut into two symmetrical portions during demolding.
Figure 6:
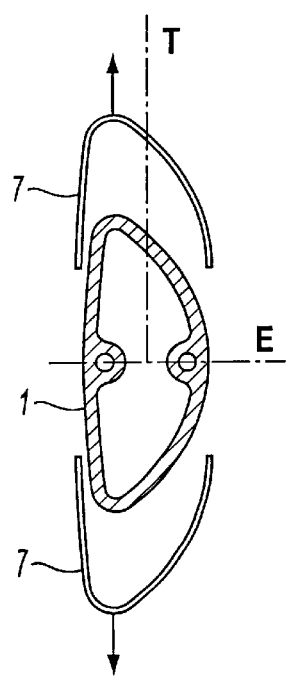
FIG. 6 is a front sectional view of the first mandrel and of the countermold cut into two symmetrical portions during demolding, viewed along the line 2—2 in FIG. 5.

In FIGS. 5 and 6, the countermold 7 has been cut after solidification, for example in its longitudinal plane of symmetry, by means of a cutting tool, for example a disk saw, mounted on the tool holder 5. In this way the countermold 7 is demolded from the mandrel 1. The step of manufacturing the countermold 7 is then terminated.

Figure 7:
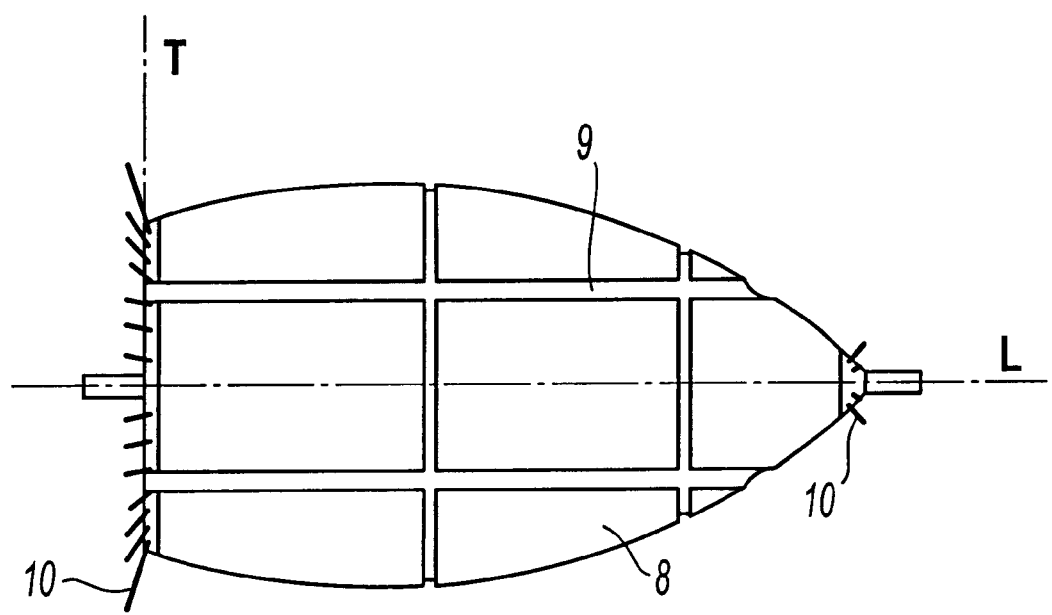
FIG. 7 is a schematic plan view of the second mandrel with transverse grooves along the direction T and longitudinal grooves along the direction L, said mandrel being formed either from an inflatable element, or from elements made of synthetic foam.

A second mandrel 8 has substantially the internal shape of the floating body 11 to be manufactured. It may have, on the one hand, longitudinal and transverse grooves 9, making it possible to wind and to position structural reinforcements and superstructure supports, and, on the other hand, rigid elements at its ends, allowing projecting devices 10, like that shown schematically in FIG. 7, to be fitted. Other devices, such as nonslip products may be placed on the mandrel 8 in order to increase the adhesion of the fibers which will cover it.

Figure 8:
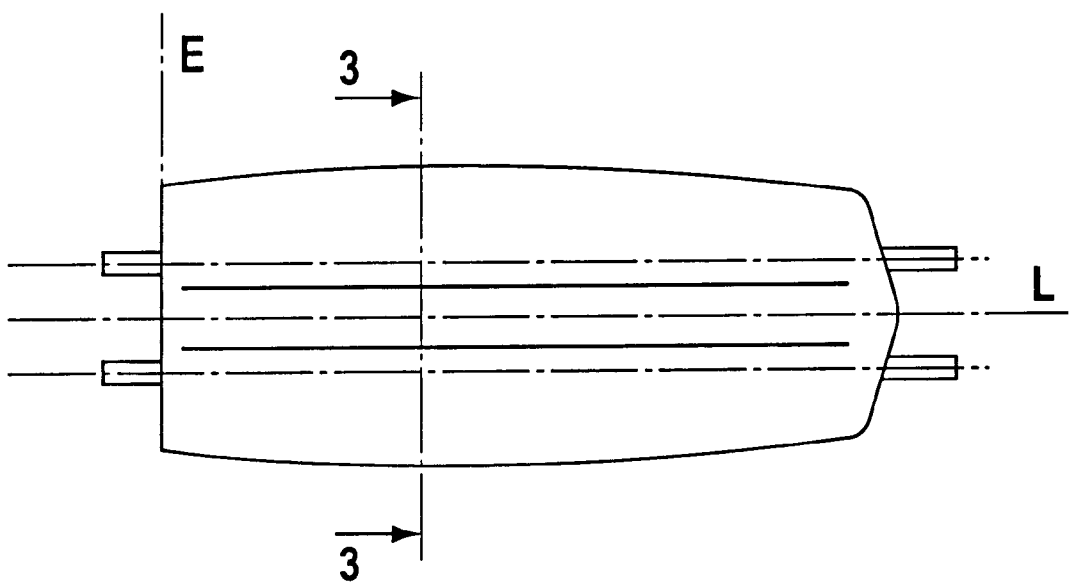
FIG. 8 is a side view of the second mandrel in the case in which it has the shape of two identical floating craft joined by their upper portion.
Figure 9:
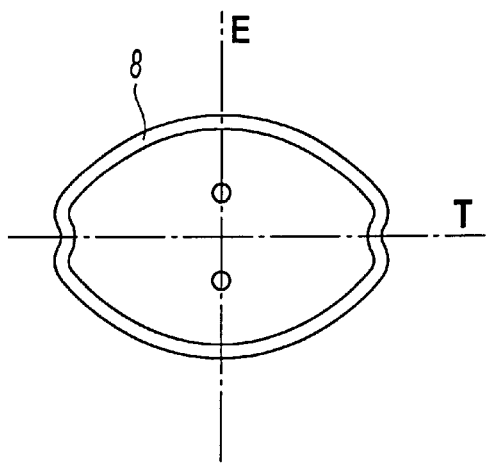
FIG. 9 is a front sectional view of the second mandrel in the case in which it has the shape of two identical floating craft joined by their upper portion, viewed along the line 3—3 in FIG. 8.
Figure 10:
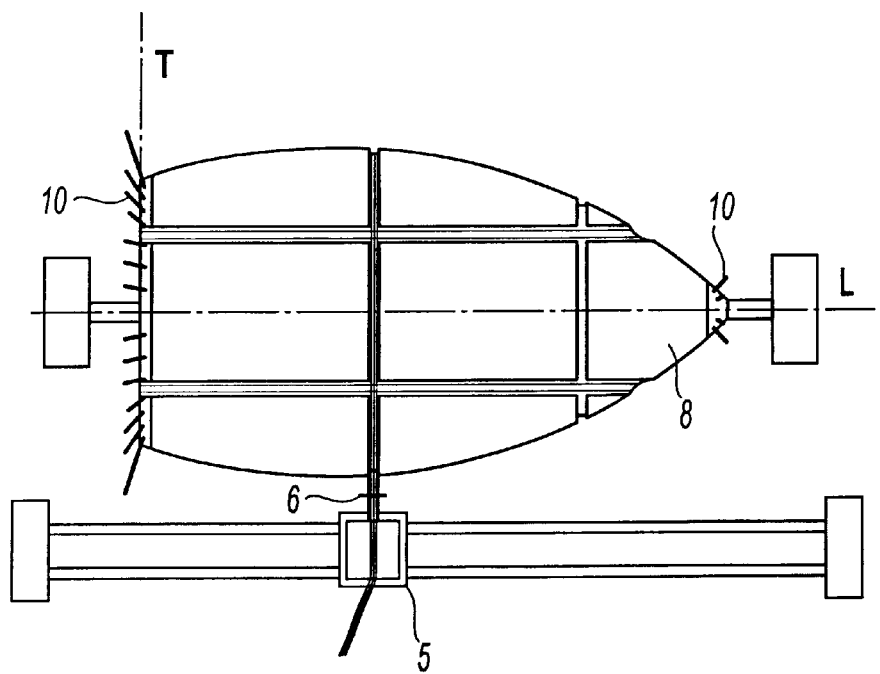
FIG. 10 is a schematic plan view of the second mandrel mounted on the winding apparatus during winding of the reinforcements of the floating body.

This mandrel 8 may consist of various elements, described below:
  either of an inflatable element;
  or, similarly to the first mandrel 1, of machined elements made of synthetic foam, possibly having intermediate sections placed between these elements, for example sandwiched plates intended to remain in the floating body as structural partitions;
  or of elements, for example made of synthetic composites, corresponding to the shape of two identical floating bodies joined by their upper portion, for example two yacht hulls fastened together by their deck, as shown in FIG. 8 and FIG. 9.

This mandrel 8 is then mounted on the winding apparatus in order to undergo, optionally, a treatment of refining its external surface. For example, a mold release agent sprayed by a spraying system, mounted on the tool holder 5, is then applied over all or part of the mandrel 8. The manufacture and the preparation of the second mandrel 8 are then terminated.

The winding of the floating body is carried out with the aid of a comb, mounted on the tool holder, which allows the fibers to be guided. It starts, for example, by winding continuous fibers in grooves, which may be entirely filled in order to obtain a monolithic reinforcing structure, or by partly inserting a core during the winding, for example made of PVC foam or balsa, in order to obtain a so-called sandwiched reinforced structure. The winding of the remainder of the former 8 is carried out by laying down the fibers so as to obtain the sampling, defined during the design, which is symmetrical with respect to the axis of symmetry of the floating body. For example, for a floating body of the single-hull yacht type, the fibers are mainly oriented at 45° and at 0° with respect to the plane of symmetry of the floating body. They are wound along a first path at 45° with respect to the axis of rotation of the mandrel as far as a so-called turnover region located between two transverse sections of the mandrel and defined at the yacht's design stage. In this region, the fibers are laid down by means of winding assists, such as pegs or nonslip products, so as to rejoin the plane of symmetry of the yacht. They then follow a second path which is symmetrical to the first path with respect to the plane of symmetry. During the design of a yacht, it is established, for example, that the turnover regions must lie in highly stressed regions, such as the bottom of the hull between the keel and the stempost of the yacht, and at the ends of the floating body. In the case of winding fibers at 0°, the turnover regions are located at the ends where the winding assists, such as pegs, are placed.

Figure 11:
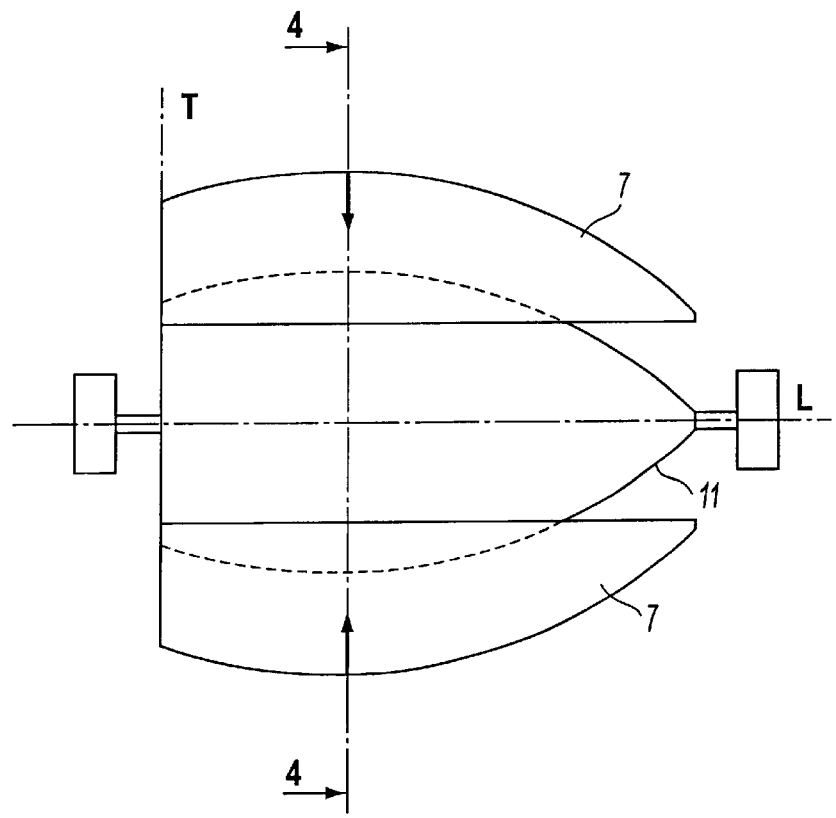
FIG. 11 is a schematic plan view of the wound floating body and of the two elements of the countermold during assembly, for the purpose of putting the materials of the floating body under pressure.
Figure 12:
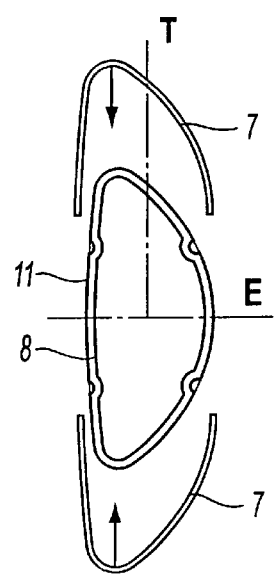
FIG. 12 is a front sectional view of the wound floating body and of the two elements of the countermold in court of [sic] assembly, for the purpose of putting the materials of the floating body under pressure, viewed along the line 4—4 in FIG. 11.

A mold release agent and a topcoat are applied to the internal part of the countermold 7. In FIG. 11 and FIG. 12, the wound floating body 11 is gripped between the second mandrel 8 and the two elements of the countermold 7. For example, in the case of an inflatable second mandrel 8, the countermold 7 may be put into place after the volume of the mandrel 8 has been reduced slightly by deflating it. The materials of the floating body 11 are then pressed against the internal surface of the countermold 7, by increasing the volume of the mandrel 8 by inflating it, so as to obtain, on the one hand, optimum cohesion between the materials of the floating body 11 and the internal surface of the countermold 7 and, on the other hand, a defined resin content. This change in volume can also be obtained mechanically, especially if the second mandrel 8 has the shape of two identical floating craft. This operation may also include the infusion or injection of resin or the use of an expanding resin, especially if the volume of the second mandrel 8 does not vary. After the materials have solidified, the various elements of the countermold 7 are disengaged.

The floating body 11 may be cut, for example with the aid of a disk saw mounted on the tool holder 5, especially, in the case of a yacht, for the passage and the joining of items of equipment such as masts, keel, chainplates, deck houses, or for removing the mandrel 8.

In the case of manufacture without a countermold, especially for one-off productions, the outer surface of the floating body 11 may undergo a refining treatment, such as grinding and spraying with a topcoat, with the aid of a specific tool mounted on the tool holder 5.

Figure 13:
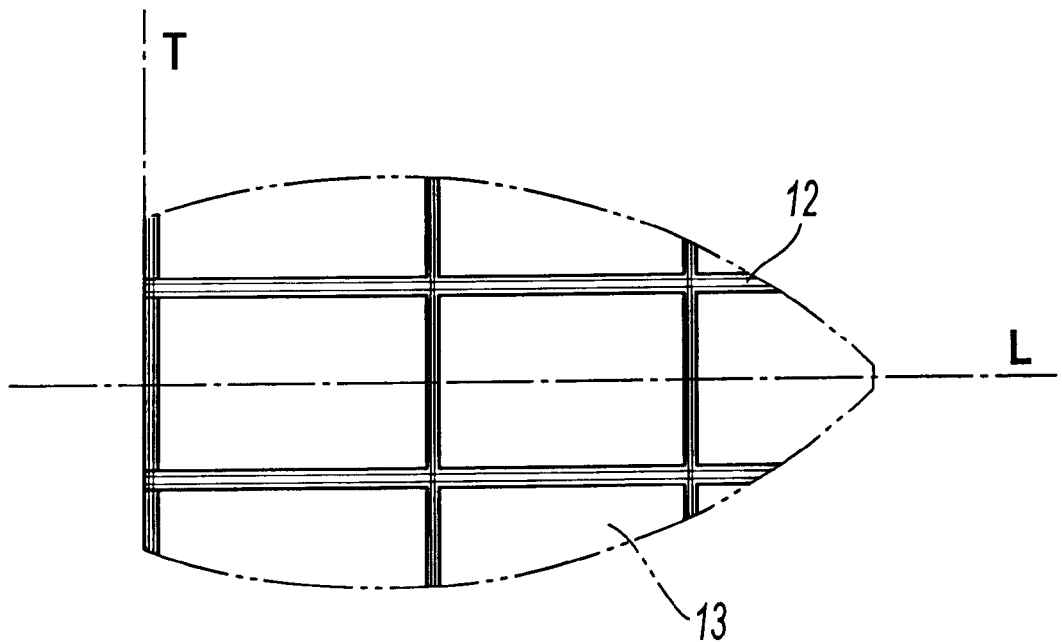
FIG. 13 is a schematic plan view of a single wound structure.
Figure 14:
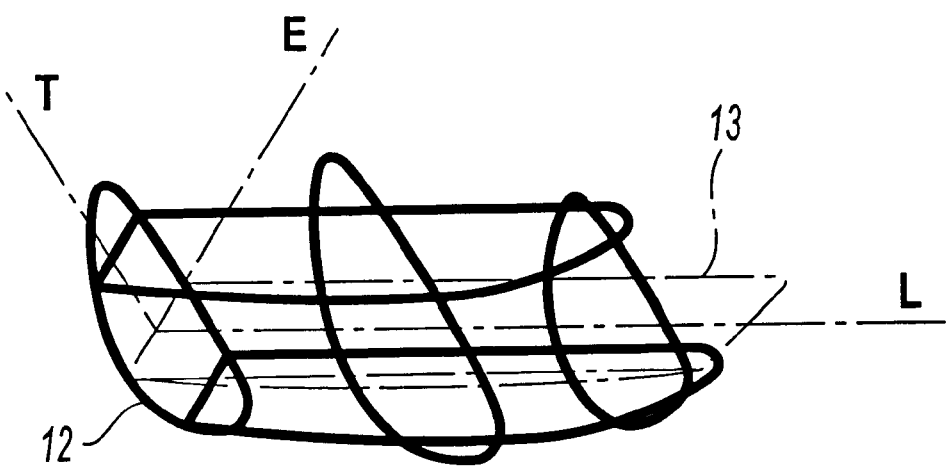
FIG. 14 is a perspective view of a single wound structure.

In order to manufacture a wound structure, labeled 12 in FIG. 13 and FIG. 14, intended to be incorporated into any floating body, the mandrel may consist of rigid elements allowing only defined reinforcements to be wound.

The advantages of such a manufacture are considerable at three levels:

the production is optimized and entirely automated, thanks to the use of software for design, for finite-element calculations, for winding simulation and for numerical-control programming. The winding apparatus becomes an automated machining, spraying, winding and cutting center. Thus, the risk of nonconformity is limited, on the one hand because of the automation which guarantees reproducibility of the product manufactured and, on the other hand, because the various operations are carried out by means of a single tool holder;

the end product has high mechanical properties, on the one hand because of the numerical approach, which allows optimization, and on the other hand because of the solidification of the composite with continuous stressed fibers. In addition, the resin content of the composite is under perfect control during manufacture and remains relatively low compared with that obtained by contact molding. In the case of a yacht in which the deck and the hull are wound at the same time, the fibers being continuous over the entire circumference of the yacht, the rigidity of the structure is increased and the risks of delamination reduced;

the positioning of the appendages and of the superstructure of the floating body is much more precise thanks to the automated cutting, which eliminates the present shortcomings in terms of symmetry;

the cost of the continuous fiber in the form of yarns on bobbins or reels is the most economical.

The device according to the invention is particularly suitable for the mass production or one-off production of at least one part of floating bodies, such as the reinforcements, the deck and the hull of floating craft, whether power boats or sail boats, whether single-hull or multi-hull, for professional use, in racing, in exploration, or for amateur use.

What is claimed is:

1. Process for manufacturing floating bodies, comprising the combination of steps providing for:

producing a first mandrel in the form of a preform, having substantially the external shape of the floating body to be manufactured;

mounting the first mandrel on a winding apparatus and, optionally, subjecting it to a treatment of refining its external shape;

covering the first mandrel, at least partly, by winding or filament winding resin-impregnated fibers so as to obtain an outer mold or countermold whose internal surface will undergo a treatment, forming the external surface of the floating body to be manufactured;

after solidification, cutting the countermold into at least two demoldable portions;

producing a second mandrel in the form of a preform, having substantially the internal shape of the floating body to be manufactured;

mounting the second mandrel on a winding apparatus and, optionally, subjecting it to a treatment of refining its external shape;

covering the second mandrel, at least partly, by winding or filament winding, with or without resin impregnation, in order to obtain a wound body which will be the floating body;

putting the materials of the floating body between the second mandrel and the countermold under pressure;

after solidifying the materials of the floating body disengaging the countermold and/or subjecting the floating body to a refining treatment, and cutting out at least one reservation in the latter.

2. Process according to claim 1, wherein the step of producing the first mandrel comprises a phase of assembling elements made of synthetic material and/or a phase of inflating an element of this first mandrel.

3. Process according to claim 1, wherein the treatment of refining the external shape of the first mandrel comprises a grinding and/or machining operation, a surface treatment and the fitting of devices of suitable material and of suitable dimensions making it possible to increase the adhesion between the mandrel and the fibers which will cover it.

4. Process according to claim 1, wherein the step of covering the first mandrel comprises a phase of joining the countermold to be manufactured to at least one structural member.

5. Process according to claim 1, wherein the step of covering the first mandrel comprises a phase of laying down at least one continuous fiber, which may or may not be impregnated with resin, along directions defined during the design of the countermold, so as to obtain at least one ply of fibers, each path of which has a plane of symmetry which is coincident with a plane of symmetry of the first mandrel, with turnover regions located between various transverse sections of the mandrel.

6. Process according to claim 1, wherein the steps of cutting the countermold are carried out by mounting, on the winding apparatus, a cutting tool, this cutting being carried out in at least on longitudinal or traverse plane or in the height direction.

7. Process according to claim 1, wherein the second mandrel in produced in a similar way to the first mandrel by assembling elements made of synthetic material, making provision to interpose at least one structural member, and/or by inflating at least one element of this mandrel.

8. Process according to claim 1, wherein the treatment of refining the external surface of the second mandrel comprises a grinding and/or machining operation, a surface treatment and the fitting of devices of suitable material and of suitable dimensions, making it possible to increase the adhesion between the mandrel and the fibers which will cover it.

9. Process according to claim 1, wherein the step of covering the second mandrel comprises a phase of joining the floating body to be manufactured to at least one structural member.

10. Process according to claim 1, wherein the step of covering the second mandrel comprises a phase of laying down at least one continuous fiber, which may or may not be impregnated with resin, along directions predefined during the design of the floating body, so as to obtain at least one ply of fibers, each path of which has a plane of symmetry which is coincident with a plane of symmetry of the second mandrel, with turnover regions located between various transverse sections of the mandrel.

11. Process according to claim 1, wherein the step of putting the materials of the floating body under pressure provides for an increase in the volume of the second mandrel and/or an injection or infusion of resin and/or the expansion of a foaming resin so as to obtain, on the one hand, a surface finish identical to that of the internal surface of the countermold and, on the other hand, a defined resin content.

12. Process according to claim 1, wherein the steps of cutting the floating body are carried out by mounting, on the winding apparatus, a cutting tool which cutting is carried out in at least one longitudinal or transverse plane or in the height direction, and which comprises at least one phase of cutting out reservations.

13. Process according to claim 1, wherein the treatment of refining the external surface of the floating body provides for a grinding and/or polishing operation and/or a surface treatment.

14. Mandrel for implementing a process according to claim 1, wherein the mandrel is composed of rings made of synthetic foam which are joined together and/or of at least one inflatable element in the form of a perform having the external shape of the floating body to be manufactures.

15. Mandrel for implementing a process according to claim 1, wherein it is composed of rings made of synthetic foam which are joined together and/or of at least one inflatable element in the form of a preform having substantially the internal shape of the floating body to be manufactured.

16. Mandrel according to claim 14, wherein it has grooves and/or projecting devices, making it possible to wind and/or position at least one structural member.

17. Apparatus for manufacturing a floating body, for implementing a process according to claim 1, on which a mandrel is mounted, wherein this apparatus has a controlled spindle which drives the mandrel in rotation and a tool holder controlled to move along three translation axes, the tool holder being provided for receiving cutting tools, for receiving tools for spraying products and for receiving grinding and polishing tools.

18. Apparatus for manufacturing a body according to claim 17, wherein the tool holder can receive a laying-down head having at least one degree of rotational freedom so as to lay down, on the mandrel, at least one continuous fiber.

19. A floating body comprising at least one hull portion manufactured by a process according to claim 1, and obtained with the aid of a mandrel.

20. A floating body comprising at least one deck portion manufactured by a process according to claim 1, and obtained with the aid of a mandrel.

21. A floating body comprising at least one hull portion and/or deck portion which are manufactured by a process according to claim 1, and obtained with the aid of a mandrel.

22. A floating body according to claim 19 comprising two hull portions manufactured simultaneously.

23. A floating body according to claim 4 comprising two hull portions manufactured simultaneously.

* * * * *